United States Patent [19]
Yamanashi

[11] Patent Number: 5,487,680
[45] Date of Patent: Jan. 30, 1996

[54] METHOD AND STRUCTURE FOR FIXING A CONNECTOR TO A VEHICLE BODY PANEL

[75] Inventor: Makoto Yamanashi, Shizuoka, Japan

[73] Assignee: Yazaki Corporation, Tokyo, Japan

[21] Appl. No.: 485,797

[22] Filed: Jun. 7, 1995

Related U.S. Application Data

[63] Continuation of Ser. No. 144,570, Nov. 2, 1993, abandoned.

[30] Foreign Application Priority Data

Nov. 4, 1992 [JP] Japan .................................. 4-294975

[51] Int. Cl.$^6$ ................................................. H01R 13/73
[52] U.S. Cl. ............................ 439/552; 439/34; 439/567
[58] Field of Search ..................... 439/34, 552, 555–557, 439/559, 567

[56] References Cited

U.S. PATENT DOCUMENTS

| | | | |
|---|---|---|---|
| 3,277,234 | 10/1966 | Dekko et al. | 439/552 X |
| 4,947,010 | 8/1990 | Heydner et al. | 439/557 X |
| 5,279,507 | 1/1994 | Kameyama | 439/552 |

*Primary Examiner*—Khiem Nguyen

[57] ABSTRACT

The present invention provides a method and a structure for coupling two mating connectors for use in vehicles, wherein the structure includes a first connector attached to the vehicle body side wire harness; a second connector attached to the door side wire harness, and a panel provided to the vehicle body for fixing the first connector to a connector fixing hole formed therein, in which the first connector further includes a pair of fitting flanges protrudedly formed at opposite lateral ends of the front portion thereof so as to be fitted with the outside surface of the panel, and a pair of resilient locking pieces respectively disposed behind said fitting flanges to be fitted with the inner surface of the panel. Since the construction is as such, when the first connector is passed through the connector fixing hole from inner side to outer side of the vehicle body side, the fitting operation thereof to the connector fixing hole can be easily done from outside the vehicle body. Furthermore, since the second connector is covered with a grommet having a sealing lip projecting forwardly therefrom, and a resisting force of the sealing lip per unit area at one side thereof is made larger than that at the other side thereof when the two mating connectors are completely coupled, a deterioration in the sealing function of the sealing lip can be avoided even from door movements.

5 Claims, 7 Drawing Sheets

METHOD AND STRUCTURE FOR FIXING A CONNECTOR TO A VEHICLE BODY PANEL

This application is a continuation-in-part of application Ser. No. 08/144,570 filed Nov. 2, 1993, now abandoned.

BACKGROUND OF THE INVENTION

1. Field of the Invention

The present invention relates to an interconnection of wire harnesses for use in vehicles and, more particularly, to a connector used for interconnecting wire harnesses at the door portion of an automobile and the like.

2. Description of the Related Art

Figure 8:
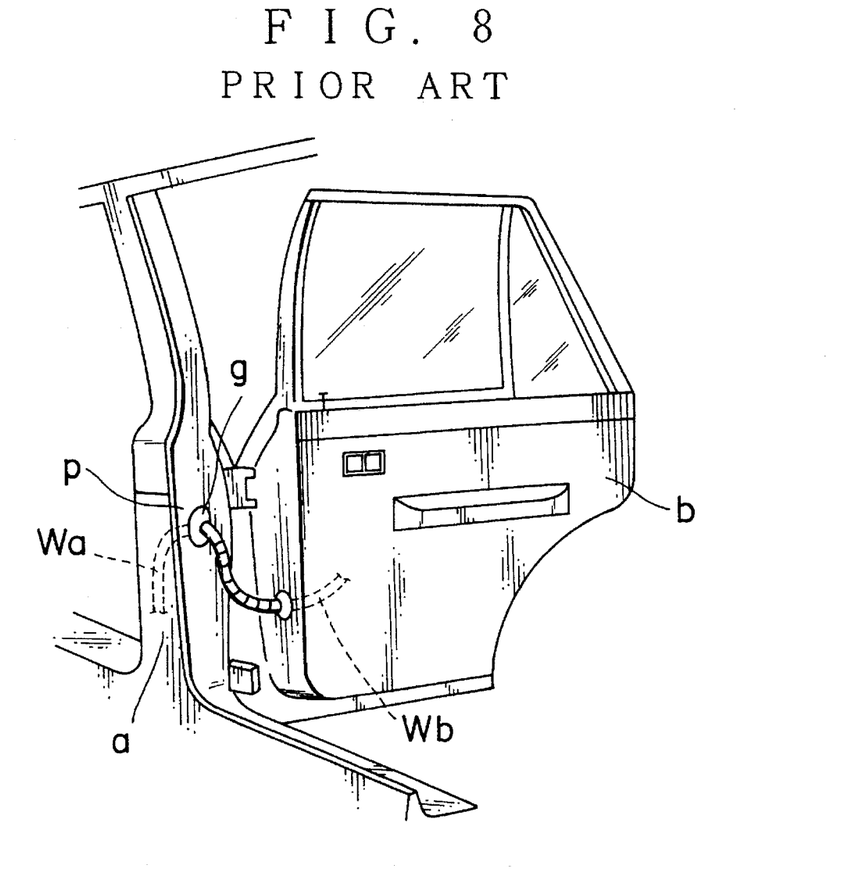
FIG. 8 is a perspective view showing the door portion of a vehicle.
Figure 9:
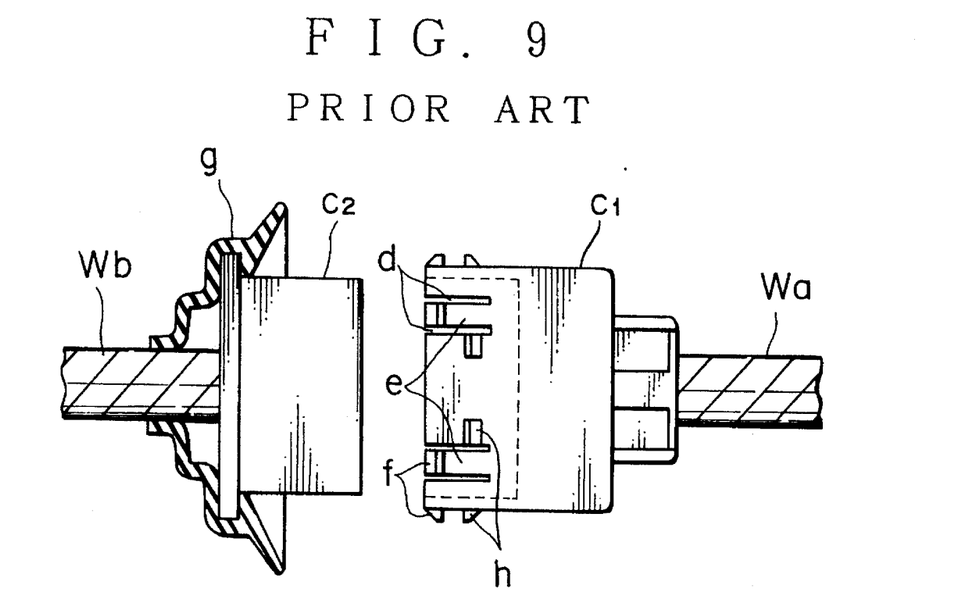
FIG. 9 is a side view showing the state in which prior connectors are separated.
Figure 10:
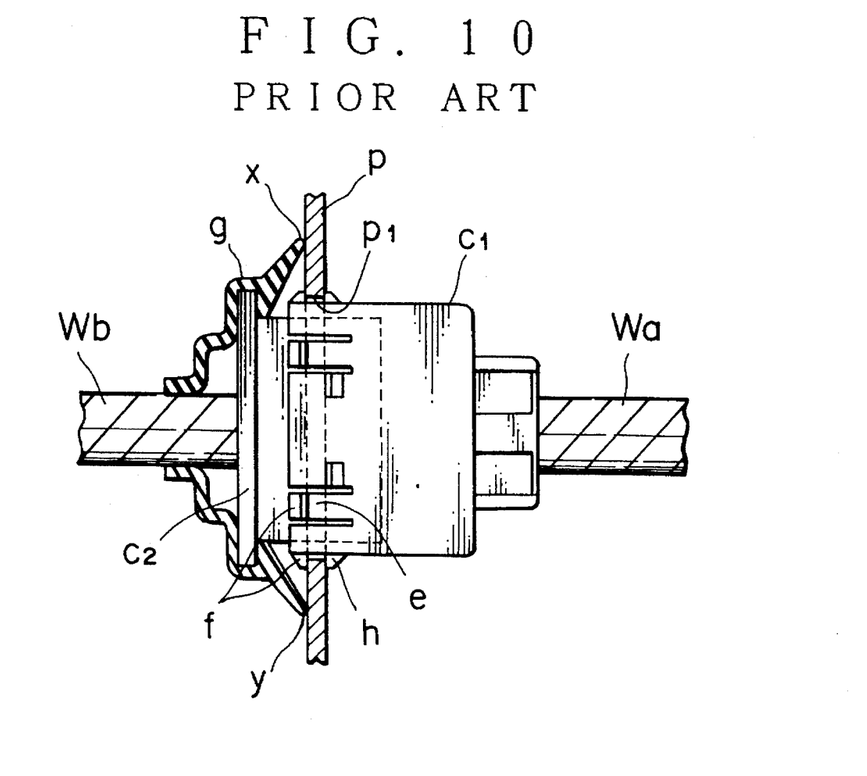
FIG. 10 is a side view showing the state in which the connectors of FIG. 9 are coupled with each other.

FIGS. 8 to 10 show a conventional structure for interconnecting wire harnesses at automotive door portions by using connectors, wherein in FIG. 8, a door b which is fitted to a vehicle body a contains a with hinges door side wire harness Wb disposed therein and extended therefrom to be coupled with a vehicle body side wire harness Wa by way of a connector at the connector fixing hole formed in a vehicle body panel P. FIG. 9 shows a female connector C1 attached to a vehicle body side wire harness Wa and a male connector C2 attached to a door side wire harness Wb, respectively made of synthetic resin, wherein the door side wire harness Wb further contains a rubber-made waterproof protecting grommet g in such a way that the male connector C2 is entirely covered thereby from its rear side. In this situation, the grommet g can be recognized from outside as shown in FIG. 8.

The female connector C1 attached to the vehicle body side wire harness Wa is formed with a plurality of resilient locking pieces e which are constructed by the slits d and each having a locking projection f at the free end thereof, and also formed with stoppers h respectively keeping a certain distance from the locking projections f.

As shown in FIG. 10, the female connector C1 attached to the vehicle body side wire harness Wa is fitted into a connector fixing hole P1 of the vehicle body panel P from the inner body side (the right side of FIG. 10), wherein when the female connector C1 is pushingly inserted into the connector fixing hole P1, the resilient locking pieces e are first inwardly deflected and gradually moved forward through the connector fixing hole P1, and thereafter, when the stoppers h are abutted to the inner surface of the vehicle body panel P, the resilient locking pieces e are resiliently returned to the original positions thereof, so that the locking projections f are latched at the outside surface of the panel P and the female connector C1 is thus fixed to the body panel P.

By this preliminary arrangement, the male connector C2 attached to the vehicle door side wire harness Wb is mated with the female connector C1 and locked by way of a known locking mechanism (not shown) which is normally situated at the middle portion of the connector, whereby the grommet g is firmly attached to the outside surface of the body panel P to function as its water-proof device.

However, with the construction above, if the female connector C1 is in such an unstable condition that a plurality of locking pieces e thereof are not perfectly fitted into the connector fixing hole P1 of the body panel P, it is likely to come off from the panel P when coupling it with the male connector C2, and in such an already advanced preparatory stage, it is quite troublesome to correctly fix the male connector C1 to the panel P from inner side of the vehicle body.

Further, with the construction above, in an opening or closing movement of the door, the male connector C2 is apt to be drawn by the door side wire harness Wb, so that the x and y portions of the grommet which are situated at the farthest ends from the locking mechanism (not shown) are likely to be detached from the body panel P thereby to form a space therebetween, and thus the efficiency as a waterproof sealing function thereof is lowered.

SUMMARY OF THE INVENTION

The present invention has been made to eliminate such problems as described above, and it is an object of the present invention to securely fit the connector of the vehicle body side wire harness to a vehicle body panel, and to improve an efficiency of water-proof function of a grommet provided to a connector of the door side wire harness.

In order to obtain the above object, the present invention provides a method for coupling a second connector which is attached to the door side wire harness with a first connector which is attached to the vehicle body side wire harness at a connector fixing hole formed in a vehicle body panel, wherein the method comprises the steps of: turning the posture of the first connector horizontally from the original fitting posture thereof; inserting the first connector from the inner vehicle side to the connector fixing hole, and penetrating therethrough to the outer side thereof; returning the posture of the first connector to the original posture thereof; pushing the first connector from an outer side of the panel backward to insert its rear side into the connector fitting hole so as to fit a pair of fitting flanges and a pair of resilient locking pieces formed on the first connector to the panel; and coupling the second connector with the first connector from outside the vehicle body.

Further, in order to attain the above object, according to one aspect of the present invention, there is formed a structure for coupling two mating connectors for use in vehicles, wherein the structure includes a first connector attached to the vehicle body side wire harness, a second connector attached to the door side wire harness, a panel provided to the vehicle body for fixing the first connector to a connector fixing hole formed therein, wherein the first connector further includes a pair of fitting flanges formed at opposite ends of the front portion thereof to protrude therefrom so as to be fitted with the outside surface of the panel. The structure also includes a pair of resilient locking pieces to be fitted with the inner surface of the panel. According to another aspect of the present invention, there is also formed a structure for coupling two mating connectors for use in vehicles, wherein the structure further comprises: a grommet for covering the second connector, which grommet being formed with an annular sealing lip projecting forwardly on the periphery of an open inlet thereof, the sealing lip being pressed against the outer surface of the panel when the second connector is coupled with the first connector which is already fitted in the connector fixing hole, and is characterized in that the resisting force stress of the annular sealing lip per unit area at one side thereof where the locking mechanism for coupling the second connector with the first connector is disposed is made larger than that of the other side.

With the above construction, during insertion of the connector of the vehicle side wire harness from outside the connector fixing hole of the panel, the resilient locking pieces are resiliently deflected inwardly by being pressed by the periphery of the connector fixing hole, and when the pair of fitting flanges are abutted to the outside surface of the panel, the resilient locking pieces are returned to their normal positions to be firmly fixed to the inner surface of the panel.

In an opening or closing movement of the door, the connector of the door side wire harness is somewhat drawn by the wire harness attached thereto, and at this stage, one part of the annular sealing lip whose resisting force is made large and predetermined by the locking mechanism prevents the deflection of the connector from the other side of the panel.

Other objects and features of the invention will be more fully understood from the following detailed description and appended claims when taken in conjunction with the accompanying drawings.

DETAILED DESCRIPTION OF THE PREFERRED EMBODIMENTS

In the following, a structure of the present invention will now be described with reference to the accompanying drawings.

In FIGS. 1 to 4, reference character C1 denotes a female connector attached to a vehicle body side wire harness Wa, and C2 denotes a male connector connected to a door side wire harness Wb, each being integrally formed synthetic resin material and containing respectively a plurality of male terminals T1 and female terminals T2. Reference character G denotes a grommet made of rubber for covering the male connector C2, and P denotes a vehicle body side panel having a connector fixing hole P1 formed therein. In the substantially elongate female connector C1, there are formed a plurality of terminal accommodating chambers 1, wherein a pair of fitting flanges 2 are provided at the opposite lateral ends of the front portion thereof, and also a cantilever shape resilient locking piece 3 is provided behind the respective fitting flanges 2. Further, at the front free end of each of the resilient locking piece 3, there is also formed a locking projection 3a keeping a certain distance corresponding to the width of the body panel P from the fitting flange 2. At the opposite lateral ends of the elongate female connector C1, there are also respectively formed with a round external peripheral portion 4 and a square external peripheral portion 5 having an arcuate corner portion 5a.

Figure 5A:
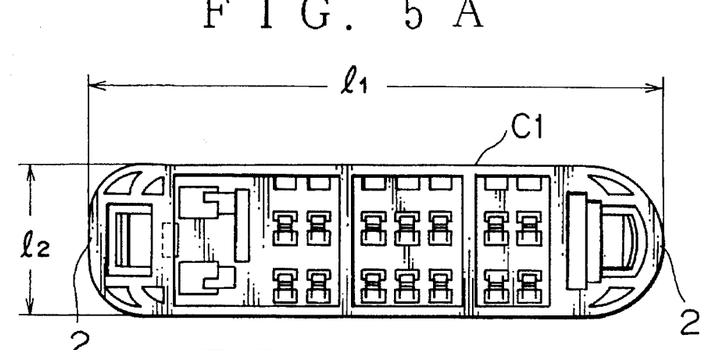
FIGS. 5A and 5B are illustrations respectively showing a front view of the connector and that of a connector fixing hole.
Figure 5B:
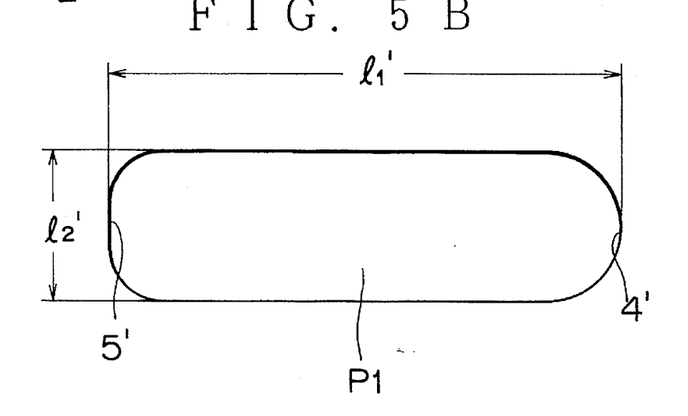

The respective adjacent portions to rear surface sides of the fitting flanges 2 have different shapes so as to allow female connector C1 to be fitted to the fixing hole P1 in only one orientation, as shown in FIG. 5A and FIG. 5B.

Figure 1:
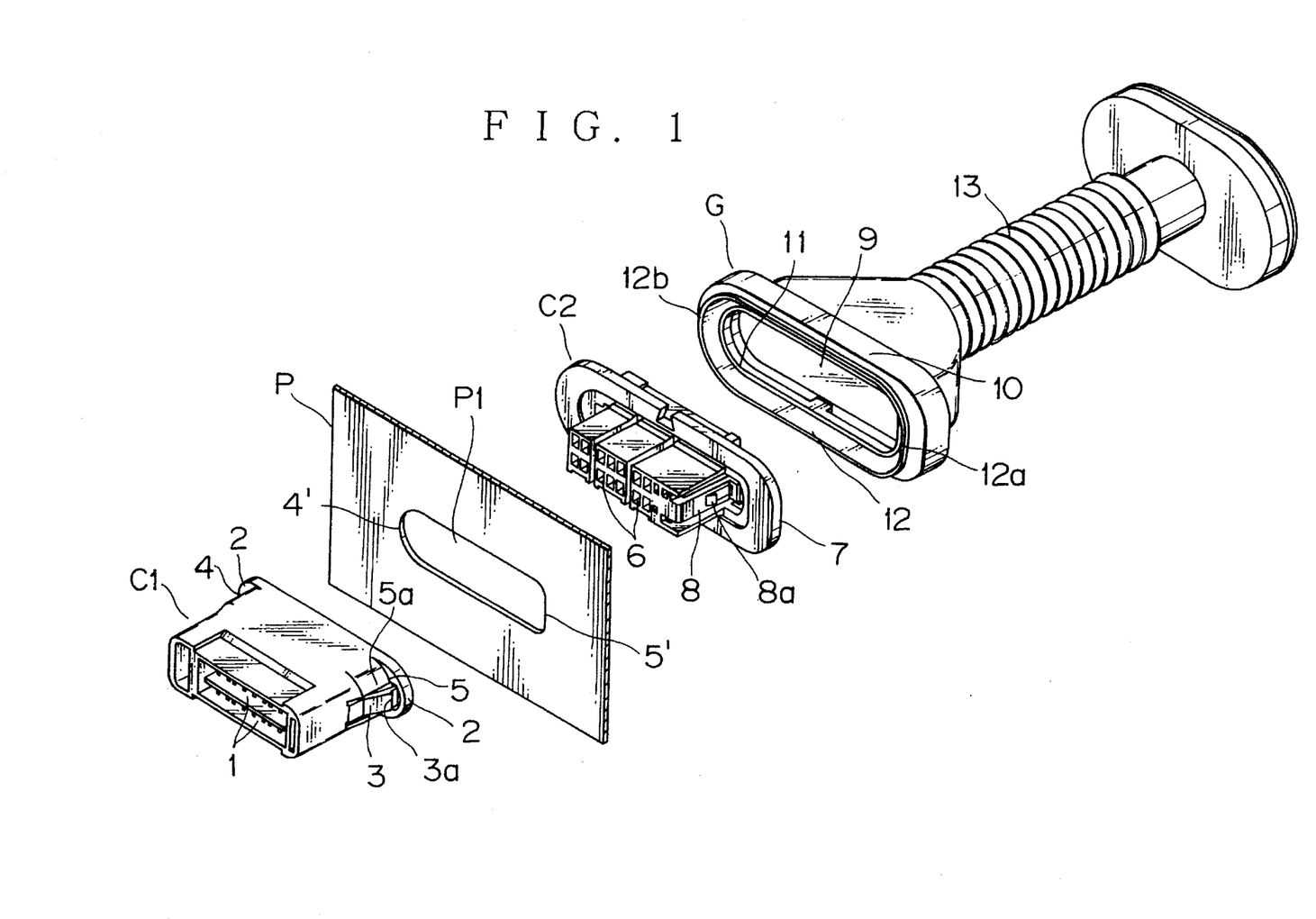
FIG. 1 is an exploded view showing a structure of the present invention in which connectors are coupled to each other.

In the male connector C2 having a substantially elongate shape to be mated with the female connector C1, there are formed a plurality of terminal accommodating chambers 6 for accommodating the female terminals T2, and on the external periphery of the connector C1, a fitting brim 7 to be fitted with the grommet G is protrudedly and successively formed. Also formed at one of the lateral ends thereof is a cantilever resilient locking arm 8 to be mated with the female connector C1.

Figure 6:
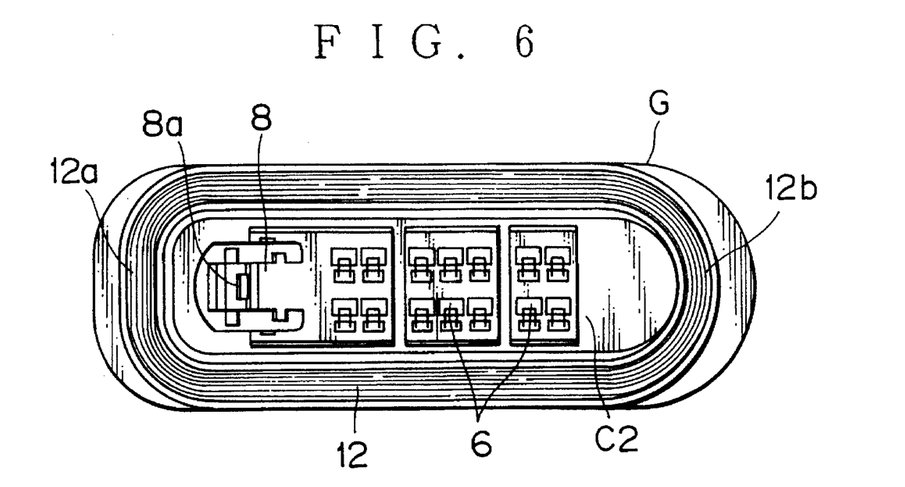
FIG. 6 is a front view showing a grommet provided to the connector of the door side wire harness.

Within the grommet G, on the inner periphery of the connector covering portion 10 having an open inlet 9 at its front portion, there is formed an annular engagement groove 11 for receiving the fitting brim 7 of the connector C2, and protrudedly formed around the periphery of the open inlet 9 is an annular sealing lip 12 expanding in the forward direction. Also successively formed at the rear part of the connector covering portion 10 is a bellow-like tubular portion 13.

As shown in FIGS. 5A and 5B, the relationship among the lengths of the longitudinal side 11, the lateral side 12, and the depth 13 of the female connector C1, and the length of the longitudinal side 11' and the lateral side 12' of the connector fixing hole P1 will be 11>11', 12'>12, and 11'>13.

Figure 2:
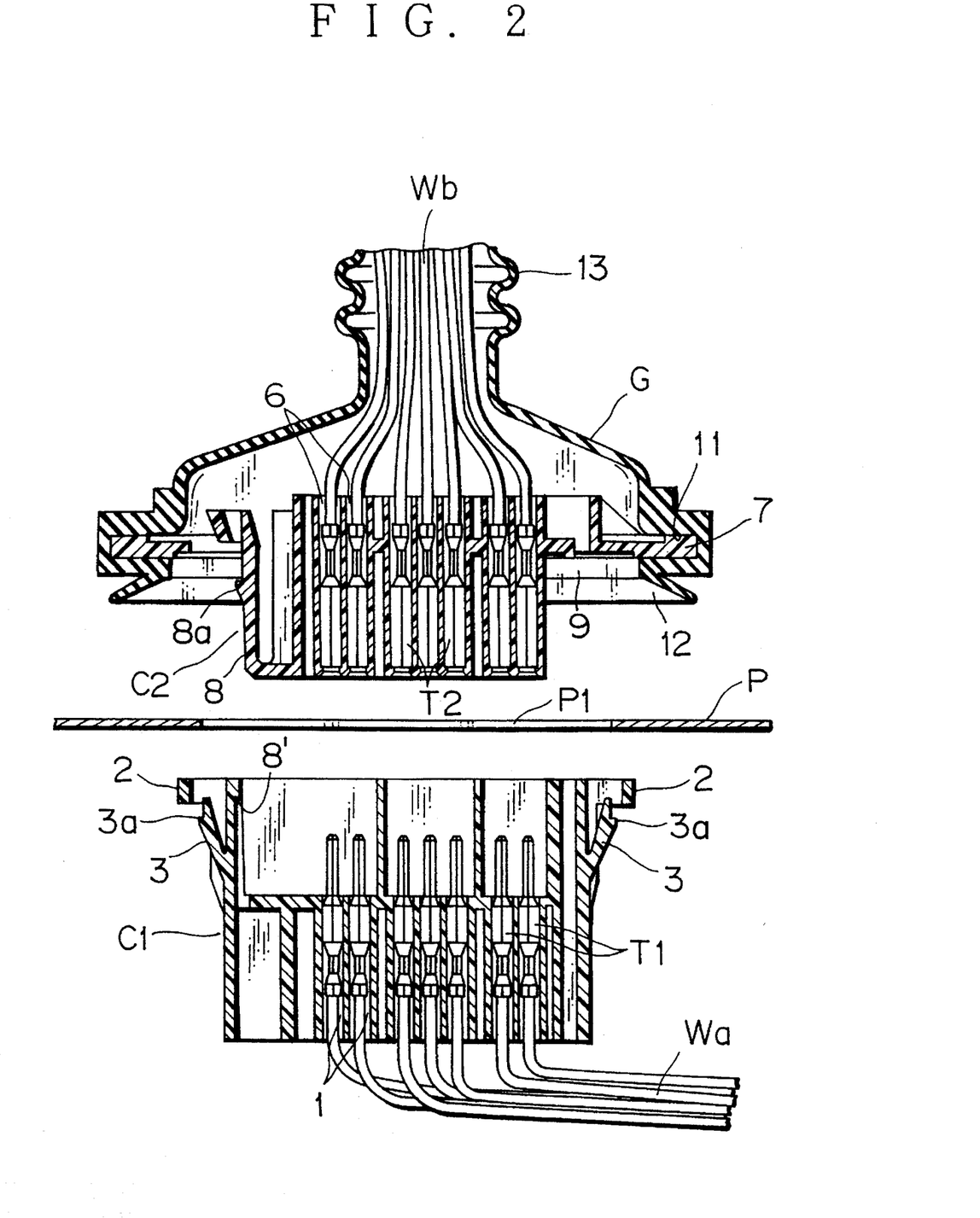
FIG. 2 is a sectional view of FIG. 1.
Figure 3:
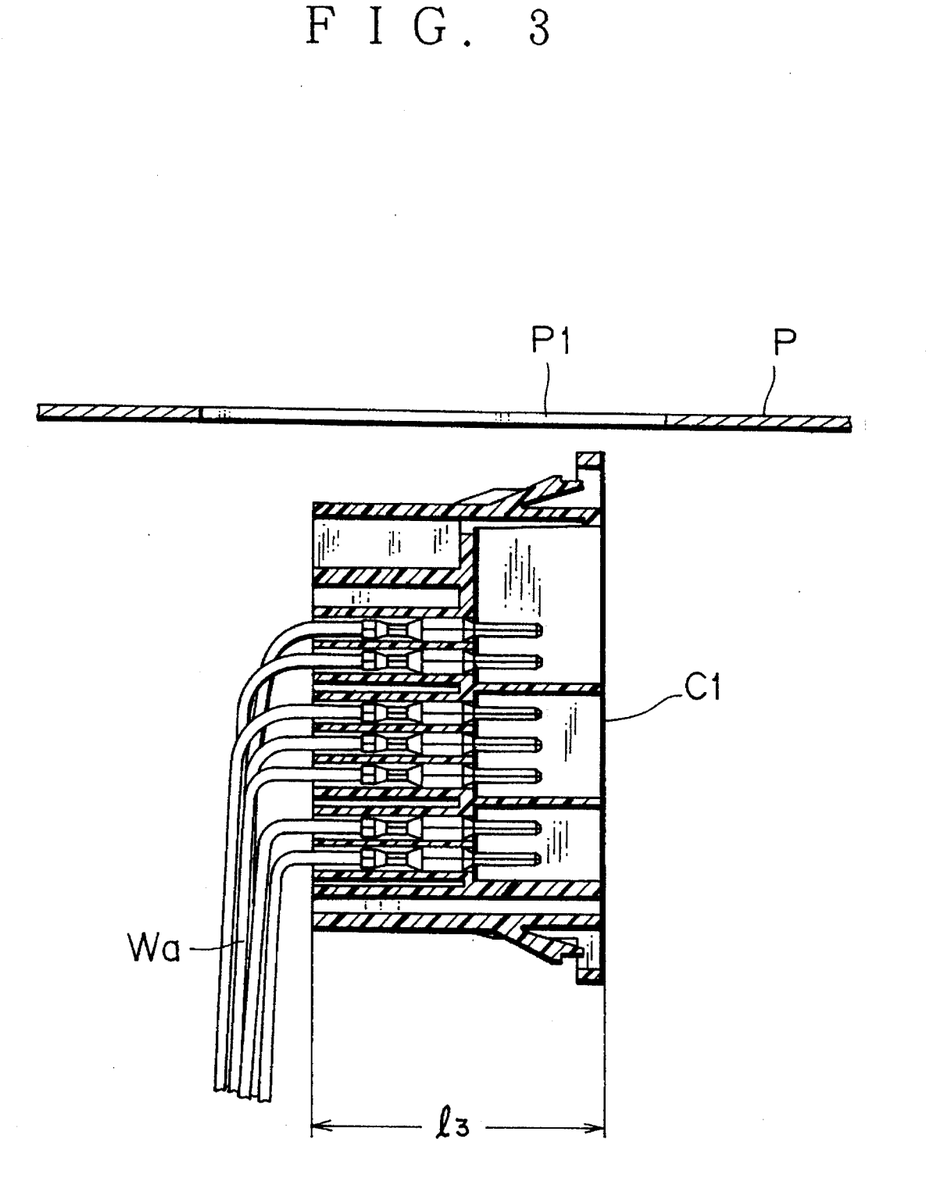
FIG. 3 is a sectional view showing a procedure for fitting a connector of the vehicle body side wire harness of FIG. 1.

With the construction above, the female connector C1 attached to the vehicle body side wire harness Wa can penetrate through the connector fixing hole P1 from the inner side to the outside of the vehicle body when it is displaced for 90 degree (FIG. 3) in the horizontal direction thereof from its original fitting posture which is in a face to face relation with the connector fixing hole P1 (FIG. 2).

Figure 4:
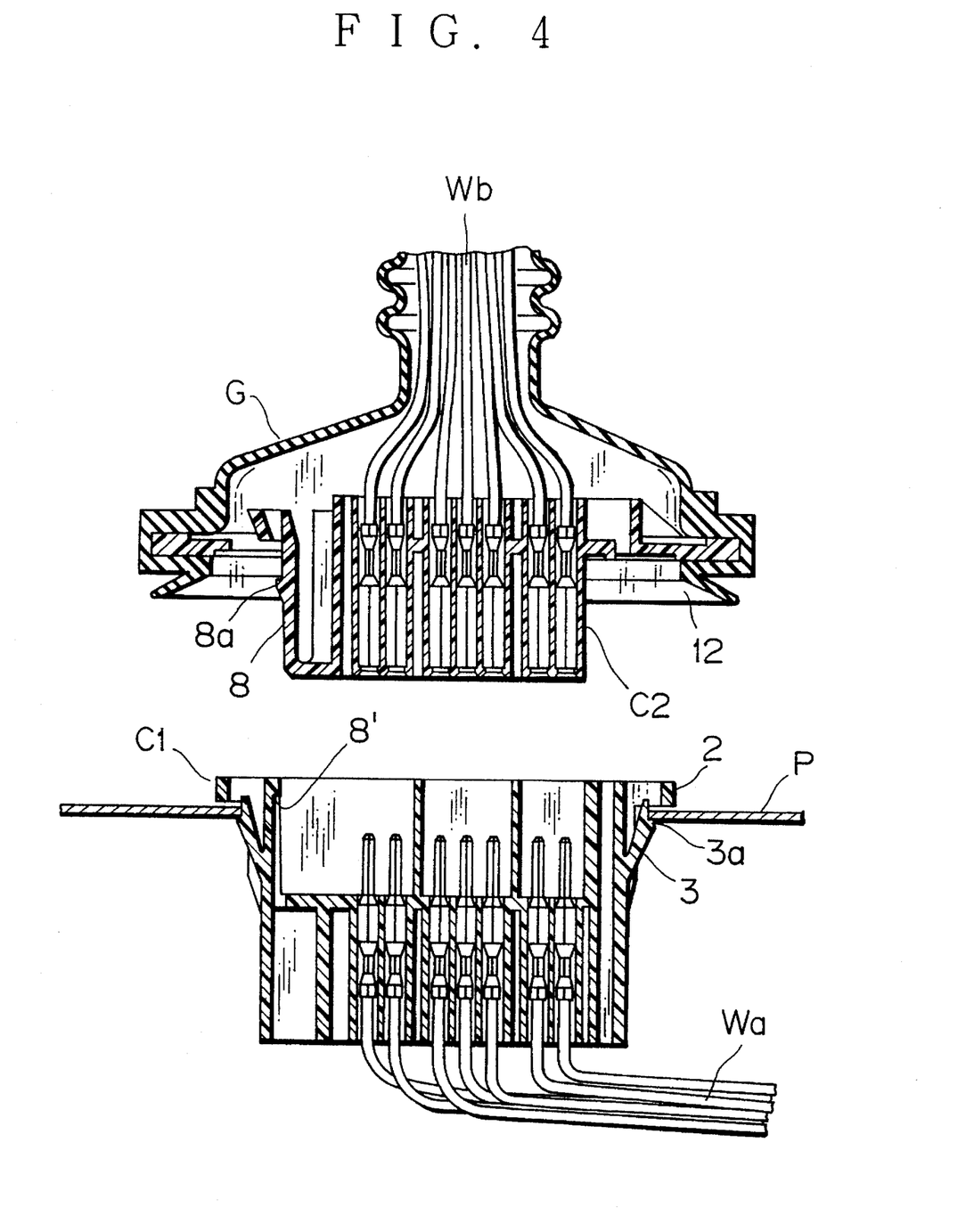
FIG. 4 is a sectional view showing the state in which the connector of the vehicle body side wire harness is already fixed.

Then, after the female connector C1 is passed through to the outer side of the vehicle body and turned for 90 degree to be put back to the original fitting posture thereof, the female connector C1 is pushed back toward the connector fixing hole P1 such that the round external periphery 4 and the square external periphery 5 respectively face the round portion 4' and the square portion 5' of the connector fixing hole P1 in order to avoid an incorrect insertion, whereas the female connector C1 is rearwardly inserted to the connector fixing hole P1 with the respective resilient locking pieces 3 thereof being deflected inwardly. When the fitting flanges 2 are abutted to the outside surface of the panel P, the resilient locking pieces 3 are returned to their original posture, and the locking projections 3a are firmly fixed to the inner surface of the panel P (FIG. 4).

In this situation above, when the female connector C2 attached to the door side wire harness Wb is fitted into the male connector C1, the locking projection 8a of the resilient locking arm 8 is engaged with the engaging part 8' of the female connector C1, thereby a perfect fitting of the connector C1 is then completed.

In the above engaging operation of the male connector C2, even if the female connector C1 is not perfectly fitted into the connector fixing hole P1 in advance, it can be easily corrected only by pushing the male connector C2 into the female connector C1.

Figure 7:
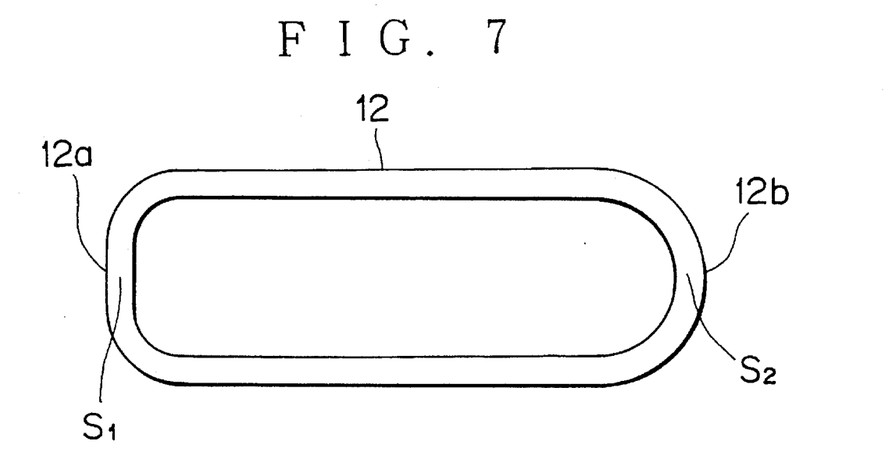
FIG. 7 is an explanatory view of an annular sealing lip.

When the male connector C2 is in a perfectly coupled state with the connector C1, the annular sealing lip 12 which is protrudedly located in the forward direction of the grommet is pressed against the outside surface of the vehicle body panel P. Regarding the annular sealing lip 12 which is rather laterally expanded, a squarely bent portion 12a is formed at one lateral end of the male connector C2 where the resilient locking arm 8 is provided, whereas a roundly bent portion 12b is formed at the other lateral end (FIGS. 1 and 7), wherein by making larger the panel contact area S1 in the annular sealing lip at the lateral side thereof where the locking mechanism is formed than the other panel contact area S2 at the opposite lateral side, the resisting force per unit area is increased. It should be noted that instead of making the size of the panel contact area of the sealing lip larger at one side than that at the other side thereof, the resisting force per unit area at one side thereof can be made larger by making one side thicker than the other side and so on.

As described above, since the present invention provides a method for coupling a second connector which is attached to the door side wire harness with a first connector which is attached to the vehicle body side wire harness at a connector fixing hole formed in a vehicle body panel, wherein the method comprises the steps of: turning the posture of the first connector horizontally from the original fitting posture thereof; inserting the first connector from the inner vehicle side to the connector fixing hole and penetrate therethrough to the outer side thereof; returning the posture of the first connector to the original posture thereof; pushing the first connector from outer side of the panel backward to insert its rear side into the connector fixing hole so as to fit a pair of fitting flanges and a pair of resilient locking pieces formed on the first connector to the panel; and coupling the second connector with the first connector from outside the vehicle body, even when the first connector is not perfectly fixed to the body panel, it does not fall into the inner vehicle body side, and further, the imperfect fitting can be corrected even when it is coupled with the second connector.

Furthermore, in the structure for coupling two mating connectors at the connector fixing hole formed in the vehicle body panel, since the structure includes a first connector attached to the vehicle body side wire harness, a second connector attached to the door side wire harness, a panel provided to the vehicle body for fixing the first connector to a connector fixing hole formed therein, wherein the first connector further includes a pair of fitting flanges protrudedly formed at opposite ends of the front portion thereof so as to be fitted with the outside surface of the panel, and also includes a pair of resilient locking pieces to be fitted with the inner surface of the panel, after the first connector is passed through the connector fixing hole of the panel from inner side to the outside of the vehicle body side, the fitting operation of the first connector to the connector fixing hole can be done from outside the vehicle body.

Still further, in the above structure for coupling the two mating connectors at the connector fixing hole formed in the body side panel, since the structure further includes a grommet for covering the second connector, which grommet being formed with an annular sealing lip projecting forwardly on the periphery of an open inlet thereof, which sealing lip being pressed against the outer surface of the panel when the second connector is coupled with the first connector which is already fitted in the connector fixing hole, and is characterized in that the resisting force of the annular sealing lip per unit area at one side thereof where the locking mechanism for coupling the second connector with the first connector is disposed is made larger than that of the other side, even when the second connector is drawn by the door side wire harness in accordance with the door opening or closing movement, a deterioration in the sealing function of the annular sealing lip at the side which is opposite to the locking mechanism can be avoided.

Having now fully described the invention, it will be apparent to one of ordinary skill in the art that many changes and modifications can be made thereto without departing from the spirit and scope of the invention as set forth herein.

What is claimed is:

1. A method for coupling a second connector which is attached to the door side wire harness with a first connector which is attached to the vehicle body side wire harness at a connector fixing hole formed in a vehicle body panel, said method comprising the steps of:

rotating said first connector from the original fitting orientation thereof so that one lateral end of said first connector faces said connector fixing hole;

inserting said first connector from the inner vehicle side to said connector fixing hole and penetrating therethrough to the outer side thereof so that said first connector completely passes through said connector fixing hole;

rotating said first connector to the original orientation thereof;

pushing said first connector from outer side of said panel backward to insert its rear side into said connector fixing hole so as to fit a pair of fitting flanges and a pair of resilient locking pieces formed on said first connector to said panel; and coupling said second connector with said first connector from outside the vehicle body.

2. A structure for coupling two mating connectors for use in vehicles, wherein said structure comprises:

a first connector attached to a vehicle body side wire harness;

a second connector attached to a door side wire harness, and having a locking mechanism at one lateral side; and a panel provided to the vehicle body for fixing said first connector to a connector fixing hole formed therein, wherein said first connector further comprises:

a pair of first and second fitting flanges formed to protrude from opposite lateral ends of the front portion, the respective adjacent portions to rear surface sides of said first and second fitting flanges having different shapes so as to allow said first connector to be fitted to said fixing hole in only one orientation, and a pair of resilient locking pieces respectively disposed behind said fitting flanges to be fitted with the inner surface of said panel;

wherein the relationship among the lengths of the longitudinal side 11, the lateral side 12, and the depth 13 of the first connector C1, and the length of the longitudinal side 11', and the lateral side 12' of said connector fixing hole P1 will be 11>11', 12'>12, and 11'>13.

3. A structure for coupling two mating connectors for use in vehicles as recited in claim 2, wherein said structure further comprises;

a grommet having a connector covering portion with an open inlet, and a sealing lip projecting forwardly on the periphery of said open inlet, wherein said sealing lip is pressed against the outer surface of said panel when said second connector is coupled with said first connector which is already fitted in said connector fixing hole, wherein a resisting force of said sealing lip per unit area at one side thereof where said locking mechanism is disposed is made larger than a resisting force of the other side thereof.

4. A structure for coupling two mating connectors for use in vehicles as claimed in claim 3, wherein said second connector further comprises a fitting brim to be mated with a fitting groove formed in said connector covering portion of said grommet.

5. A structure for coupling two mating connectors for use in vehicles as claimed in claim 3, wherein said grommet further comprises a below-like tubular portion successively formed at a rear portion of said connector covering portion.

* * * * *